HINDS & GEE.
Wheel Cultivator.

No. 85,095.

Patented Dec. 22, 1868.

JAMES HINDS AND JAMES GEE, OF CONOLOGUE, ILLINOIS.

Letters Patent No. 85,095, dated December 22, 1868.

IMPROVEMENT IN CULTIVATORS.

The Schedule referred to in these Letters Patent and making part of the same.

*To all whom it may concern:*

Be it known that we, JAMES HINDS and JAMES GEE, of Conologue, in the county of Edgar, and State of Illinois, have invented a new and useful Improvement in Cultivators; and we do hereby declare that the following is a full, clear, and exact description thereof, which will enable others skilled in the art to make and use the same, reference being had to the accompanying drawings, forming a part of this specification.

The object of this invention is to provide improvements in cultivators, whereby they may be more readily adjusted and operated than as at present constructed.

It consists of an improved arrangement of means for raising the plows out of the ground and suspending them above it; also, an improved method of hinging the plow-beams to the frame; and also, an improved means of adjusting the pitch of the plows.

Figure 1:
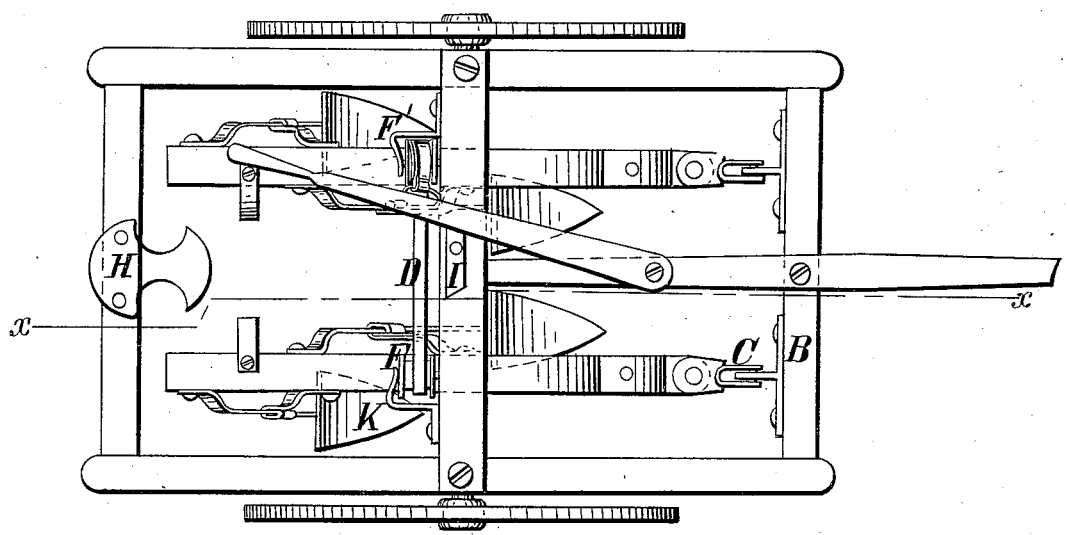
Figure 2:
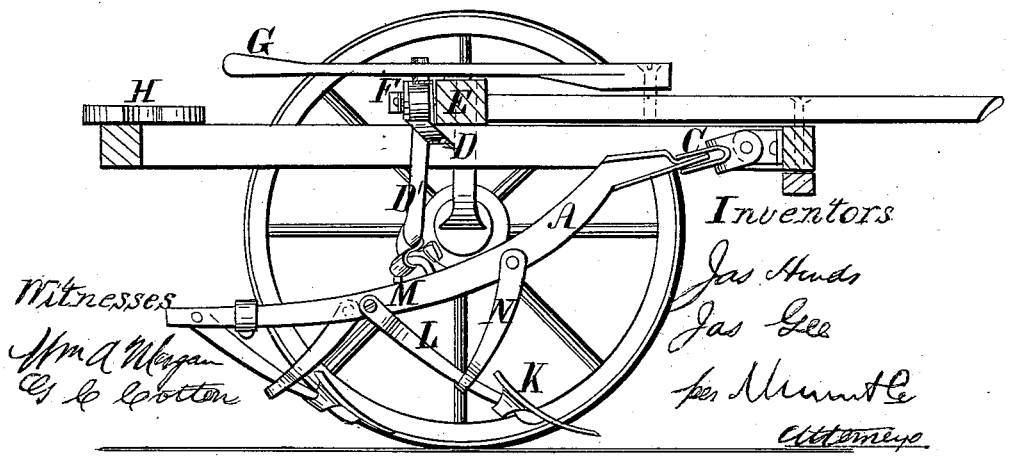

Figure 1 represents a plan view of a cultivator constructed according to our improvements, and Figure 2 represents a sectional elevation of the same, taken on the line $x\ x$ of fig. 1.

Similar letters of reference indicate corresponding parts.

A represents the plow-beams, which are connected to the cross-beam B of the frame, by a double hinge-joint, C, to admit them to vibrate vertically or laterally, or in planes at any angle thereto.

D and D' represent straps by which the beams are suspended vertically from the cross-beam E, which are carried over the pulleys F and F', as shown, and attached to the lever G, by a movement of which, in a direction to the right of the operator, as he sits on the seat H, the plows may be raised out of contact with the ground, and by dropping the lever behind the stop I, they may be suspended in that position.

K represents the plows secured to the one end of arms L, which are pivoted at their outer ends to the beams at M.

N represents supporting-arms pivoted to the beams A, at O, and provided with a loop at the other end, through which the plow-arms L pass, to be supported at their lower ends, and by which their pitch may be varied by sliding the looped ends of the supporting-arms in one direction or the other on the said plow-arms, a wedge being used to secure the arms N and L together, at any desired position, by driving it into the loop against the arm L.

Having thus described our invention,

What we claim as new, and desire to secure by Letters Patent, is—

1. The arrangement of the belts D D', pulleys F F', and lever G, substantially as and for the purpose specified.

2. The combination, with the plow-supporting arms L, pivoted to the beams A, of the adjustable supporting-arms N, when provided with a loop which slides upon the arms L, substantially as and for the purpose described.

JAMES HINDS.
JAMES GEE.

Witnesses:
H. O. SNYDER,
S. COLLIE.